United States Patent
Choi et al.

[11] Patent Number: 5,905,660
[45] Date of Patent: May 18, 1999

[54] DISCRETE COSINE TRANSFORM CIRCUIT FOR PROCESSING AN 8×8 BLOCK AND TWO 4×8 BLOCKS

[75] Inventors: Jang-Sik Choi, Daeduk-ku; Ki-Hyun Kim; Kyung-Joon Song, both of Yusong-ku; Sang-Beom Kim, Seo-ku, all of Rep. of Korea

[73] Assignee: Electronics and Telecommunications Research Institute, Daejeon, Rep. of Korea

[21] Appl. No.: 08/709,841

[22] Filed: Sep. 10, 1996

[30] Foreign Application Priority Data

Dec. 21, 1995 [KR] Rep. of Korea ............. 95-53627

[51] Int. Cl.[6] .................................................. G06F 17/14
[52] U.S. Cl. ............................... 364/725.03; 364/725.02
[58] Field of Search ........................ 364/725.03, 725.02

[56] References Cited

U.S. PATENT DOCUMENTS

| | | | |
|---|---|---|---|
| 5,181,183 | 1/1993 | Miyazaki | 364/725.03 |
| 5,420,811 | 5/1995 | Ohki | 364/725.03 |
| 5,479,364 | 12/1995 | Jones et al. | 364/725.03 |
| 5,483,475 | 1/1996 | Kao | 364/725.03 |
| 5,539,836 | 7/1996 | Babkin | 364/725.03 |

*Primary Examiner*—David H. Malzahn
*Attorney, Agent, or Firm*—Nixon & Vanderhye P.C.

[57] ABSTRACT

A discrete cosine transform circuit for processing an 8×8 block and two 4×8 blocks, comprising a first shuffle circuit for performing a first one-dimensional discrete cosine transform, a second shuffle circuit for performing a second one-dimensional discrete cosine transform, a first multiplexing circuit for selecting inputs to input terminals of adders/subtracters in the second shuffle circuit according to an input block size, ROMs for storing a data table therein to support all cosine matrices to perform a matrix multiplication operation based on the input block size, and a second multiplexing circuit for selecting a desired one of outputs from the ROMs according to the input block size. Therefore, according to the present invention, common and different parts for the process of two different block sizes are all implemented on a single circuit and controlled to process forward and inverse discrete cosine transforms.

10 Claims, 4 Drawing Sheets

DISCRETE COSINE TRANSFORM CIRCUIT FOR PROCESSING AN 8×8 BLOCK AND TWO 4×8 BLOCKS

BACKGROUND OF THE INVENTION

1. Field of the Invention

The present invention relates to a forward/inverse discrete cosine transform (referred to hereinafter as DCT) circuit using a distributed arithmetic processing manner.

2. Description of the Prior Art

Generally, conventional 8×1 DCT associated techniques relate to a forward/inverse DCT circuit using a distributed arithmetic processing manner. One example of such a conventional 8×1 DCT associated technique is disclosed in U.S. Pat. No. 5,357,453. The '453 patent shows a method for efficiently implementing a DCT circuit which is capable of converting a video signal into a frequency signal in real time.

FIG. 1 shows a conventional one-dimensional DCT circuit which performs forward and inverse 8×1 DCT operations using the distributed arithmetic processing manner. The operation and construction of the conventional 8×1 DCT circuit are disclosed in detail in the '453 patent.

The 8×1 DCT implementation in FIG. 1 can be extended to an 8×8 DCT. An example of such an 8×8 DCT implementation is shown in block form in FIG. 2. The representative method of 8×8 DCT implementation is to sequentially perform the 8×1 DCT operation with respect to an input 8×8 block in the order of row, a row/column substitution operation and the 8×1 DCT operation with respect to the input 8×8 block in the order of column. Of course, a circuitry is provided to perform the row/column substitution operation between the 8×1 DCT operation in the order of row and the 8×1 DCT operation in the order of column. As a result, the 8×8 DCT implementation is provided with two 8×1 DCT circuits, each of which is shown in FIG. 1, and a row/column substitution circuit, as shown in FIG. 2.

The 8×8 inverse DCT (referred to hereinafter as IDCT) operation is performed in the reverse order of the 8×8 forward DCT operation. Namely, the 8×8 IDCT operation is performed by sequentially carrying out the 8×1 IDCT operation with respect to DCT coefficients in the order of column, the row/column substitution operation and the 8×1 IDCT operation with respect to the DCT coefficients in the order of row. As a result, original pixels are restored.

The 8×8 DCT implementation requires no additional circuitry in performing the forward and inverse 8×8 DCT operations, because the conventional 8×1 DCT circuits of the same construction support both the forward and inverse 8×8 DCT operations.

As mentioned above, the two-dimensional 8×8 DCT operation is performed by using the conventional 8×1 DCT circuit. The compression efficiency of an image compression coding process is determined according to the size of a block to be DCT-processed. Namely, in the case where the block is small in size, it is readily processed but reduced in the compression efficiency. On the contrary, in the case where the block is large in size, it is increased in the compression efficiency but difficult to process. In other words, a larger image size is desirable in view of the compression efficiency, but has a difficulty in processing.

The sizes of blocks to be DCT-processed are 2×2, 4×4, 8×8, 16×16 and 32×32. The 4×4 and 8×8 block sizes among the above-listed block sizes are widely used in the standard compression/expansion coding process. In particular, the JPEG, H.261 AND MPEG standards prescribe the process of only 8×8 block.

However, in the digital video cassette recorder (referred to hereinafter as DVCR) standards, the size of an input block to be DCT-processed is determined according to a block motion. Namely, in the case where little block motion is present, an 8×8 DCT is processed. However, in the case where a large block motion is present, two 4×8 DCTs are processed by performing addition and subtraction operations with respect to two vertically adjacent pixels in block. Such a DCT process of different block sizes is performed for enhancing the coding efficiency and picture quality. However, the conventional 8×8 DCT processing circuit requires a large number of additional components to process two 4×8 DCTs.

SUMMARY OF THE INVENTION

Therefore, the present invention has been made in view of the above problem, and it is an object of the present invention to provide a DCT circuit which is capable of efficiently processing an 8×8 block and two 4×8 blocks together in consideration of coding efficiency and picture quality by using a conventional 8×8 block DCT processing construction.

In accordance with one aspect of the present invention, there is provided a discrete cosine transform circuit for processing an 8×8 block and two 4×8 blocks, comprising a first shuffle circuit for performing a first one-dimensional discrete cosine transform; a second shuffle circuit for performing a second one-dimensional discrete cosine transform; first multiplexing means for selecting inputs to input terminals of adders/subtracters in the second shuffle circuit according to an input block size; storage means for storing a data table therein to support all cosine matrices to perform a matrix multiplication operation based on the input block size; and second multiplexing means for selecting a desired one of outputs from the storage means according to the input block size; whereby common and different parts for the process of two different block sizes are all implemented on a single circuit and controlled to process forward and inverse discrete cosine transforms.

The first multiplexing means includes a plurality of 2-bit multiplexers for selecting inputs to input terminals of adders/subtracters in a first shuffle stage of the second shuffle circuit according to the input block size to process two different block sizes in the second one-dimensional discrete cosine transform.

In accordance with another aspect of the present invention, there is provided a discrete cosine transform circuit comprising means for extending an 8×1 discrete cosine transform to a two-dimensional discrete cosine transform to process an 8×8 discrete cosine transform; and means for performing addition and subtraction operations with respect to two vertically adjacent pixels in block to perform two 4×8 discrete cosine transforms.

BRIEF DESCRIPTION OF THE DRAWINGS

The above and other objects, features and advantages of the present invention will be more clearly understood from the following detailed description taken in conjunction with the accompanying drawings, in which.

DETAILED DESCRIPTION OF THE PREFERRED EMBODIMENTS

Figure 1:
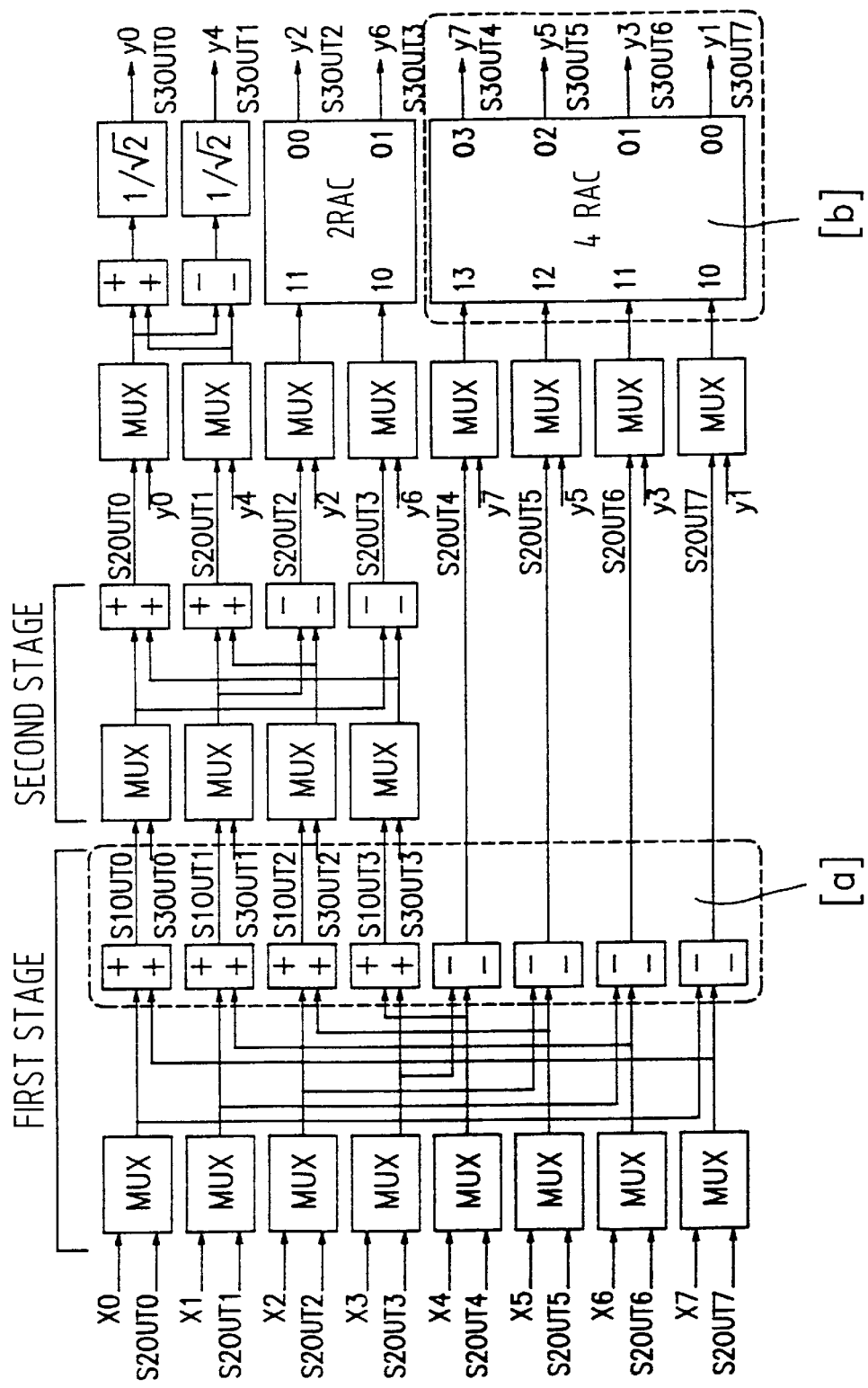
FIG. 1 is a detailed block diagram illustrating the construction of a conventional 8×1 DCT circuit using a distributed arithmetic processing manner.
Figure 2:
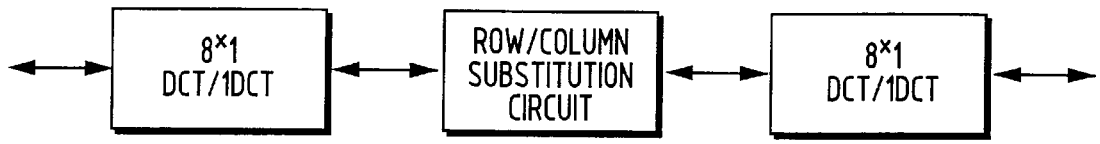
FIG. 2 is a schematic block diagram illustrating the construction of a conventional 8×8 DCT circuit which is implemented based on the conventional 8×1 DCT circuit in FIG. 1.

In accordance with the preferred embodiment of the present invention, a DCT circuit for processing an 8×8 block and two 4×8 blocks is provided by adding a circuitry for processing the two 4×8 blocks and a circuitry for performing a control operation according to a DCT operation mode based on an input block, to a conventional 8×8 DCT processing construction. Therefore, the DCT circuit of the present invention can process the 8×8 block and two 4×8 blocks by simply changing the DCT operation mode according to two input blocks.

First, DCT equations of the DVCR standards will hereinafter be described.

Two 4×8 forward DCTs can be defined by the following equations (1):

$$F(u, v) = \frac{1}{4} C(u)C(v) \sum_{y=0}^{3} \sum_{x=0}^{7} [f(x, 2y) + f(x, 2y+1)] C_f(x, u) C_f(y, v) \quad (1)$$

$$F(u, v+4) = \frac{1}{4} C(u)C(v) \sum_{y=0}^{3} \sum_{x=0}^{7} [f(x, 2y) - f(x, 2y+1)] C_f(x, u) C_f(y, v)$$

Two 4×8 IDCTs can be defined by the following equations (2):

$$F(x, 2y) = \frac{1}{4} \sum_{y=0}^{3} \sum_{x=0}^{7} C(u)C(v)[f(u, v) + f(u, v+4)] C_f(x, u) C_f(y, v) \quad (2)$$

$$F(x, 2y+1) = \frac{1}{4} \sum_{y=0}^{3} \sum_{x=0}^{7} C(u)C(v)[f(u, v) - f(u, v+4)] C_f(x, u) C_f(y, v)$$

$$C(i) = \begin{cases} \frac{1}{2\sqrt{2}}, & \text{if } i = 0 \\ \frac{1}{2}, & \text{if } i \neq 0 \end{cases}$$

$C_f(x,u)$ and $C_f(y,v)$ in the above equations (1) and (2) can be defined as follows:

$$C_f(x, u) = \cos(2x+1)\pi \frac{u}{16} \quad (3)$$

$$C_f(y, v) = \cos(2y+1)\pi \frac{v}{8}$$

In the above equations (1), the first 8×1 DCT operation is performed by multiplying vertical sum and difference by a cosine matrix in the order of column. Then, a row/column substitution operation is performed with respect to the 8×1 DCT result and the substituted result is applied to two 4×1 DCTs. As a result, the final DCT results are obtained.

In the above equations (2), a 2×4×1 IDCT operation is performed and the row/column substitution operation is performed with respect to the two 4×1 IDCT results. Then, an 8×1 IDCT operation is performed with respect to the substituted results and vertical sum and difference of the 8×1 IDCT results are calculated.

A circuit for performing the above-mentioned process is implemented by adding a vertical sum and difference calculation circuit to the first one-dimensional DCT circuit in the 8×8 DCT construction using the conventional 8×1 DCT construction and by removing addition/subtraction circuits at a first shuffle stage in FIG. 1 from a shuffle circuit in the second one-dimensional DCT circuit in the 8×8 DCT construction.

As a result, the above-mentioned process takes a stand against the present intention to utilize the conventional DCT construction without any change. Also, the above-mentioned process requires different constructions for the forward and inverse DCT operations.

Therefore, the main object of the present invention is to provide a construction for processing the 8×8 DCT and two 4×8 DCTs without greatly changing the conventional 8×1 DCT construction.

Now, the 2×4×8 DCT operation in accordance with the present invention will be mentioned in detail.

In the forward DCT operation of the above equations (1), [f(x,2y)±f(x,2y+1)] is divided into f(x,2y) and f(x,2y+1), instead of multiplying the vertical sum and difference by the cosine matrix. Then, an 8×1 input vector of the divided [f(0,2y) . . . f(7,2y)] and [f(0,2y+1) . . . f(7,2y+1)] is multiplied by an 8×8 matrix of $C_f(x,u)$. As a result, the 8×1 DCT result is obtained. At this time, the 8×1 DCT operation is performed with respect to each column to produce an 8×8 matrix. In the second DCT operation, addition and subtraction of [f(0,2y) f(0,2y+1)] are performed with respect to each row of the produced 8×8 matrix. Namely, the calculation of the sum and difference to be performed in the 8×1 DCT operation of the previous stage is performed in the 8×1 DCT operation of the present stage, resulting in no great change in the conventional 8×1 DCT construction. Two 4×1 input vectors are obtained as a result of the addition and subtraction and then multiplied by a 4×4 matrix of $C_f(y,v)$. As a result, the two 4×1 DCT results are obtained.

In the inverse DCT operation of the above equations (2), an 8×1 input vector for the inverse DCT is divided into two 4×1 vectors and then multiplied by a 4×4 matrix. The addition and subtraction operations and the row/column substitution operation are sequentially performed with respect to the multiplied results. Then, the 8×1 IDCT operation is performed with respect to the substituted results. As a result, the two 4×8 IDCT results are obtained.

The inverse DCT operation is performed in the reverse order of the forward DCT operation by using the same circuits and by merely changing a data transfer path of the forward DCT operation in the opposite direction.

In the second one-dimensional DCT construction for the process of the 8×8 DCT and two 4×8 DCTs, the 8×8 DCT is processed by two 8×1 DCTs which are the same. Namely, the 8×8 DCT process is performed by two 8×1 DCTs and row/column substitution for the forward and inverse transform between the input pixel block and DCT coefficients. The two 8×1 DCTs are substantially the same in construction as the conventional 8×1 DCT, with the exception of input/output interface.

However, the two 4×8 DCTs are processed by two different 8×1 DCTs. Namely, the first 8×1 DCT is the same in construction as the conventional 8×1 DCT, but the second 8×1 DCT is different in construction from the conventional 8×1 DCT because it processes the two 4×1 DCTs.

For the implementation of the above-mentioned two two-dimensional DCTs with different constructions according to a block size on a single circuit, the first 8×1 DCT employs the conventional 8×1 DCT directly because it has the same construction regardless of a block size. However, because the second 8×1 DCT has different constructions according to a block size, it requires a circuit which is capable of supporting all different constructions.

The change in the construction of the second 8×1 DCT can be accomplished by a provision of a shuffle circuit at the pre-process (forward)/post-process (inverse) stages for the matrix multiplication and a ROM/accumulator in cascade (referred to hereinafter as RAC) circuit for performing a distributed arithmetic process according to the contents of a cosine matrix in multiplying it by a vector produced in the shuffle circuit.

Now, a point of difference of the shuffle circuit at the pre-process/post-process stages will be mentioned in detail.

The calculations at the pre-process/post-process stages for the 8×8 DCT can be performed at the first shuffle stage as follows:

$$A(1) = X0 + X7, A(2) = X1 + X6, A(3) = X2 + X5, A(4) = X3 + X4 \quad (4)$$

$$A(5) = X3 - X4, A(6) = X2 - X5, A(7) = X1 - X6, A(8) = X0 - X7$$

The values in the above equations (4) are applied to a second shuffle stage so that they can be calculated as follows:

$$B(1) = A(1) + A(2), B(2) = A(3) + A(4) \quad (5)$$

$$B(3) = A(3) - A(4), B(4) = A(1) - A(2)$$

At the pre-process/post-process stages for the two 4×8 DCTs, the calculation of vertical sum and difference to be performed in the first one-dimensional DCT is performed in the second one-dimensional DCT. As a result, the calculations of A(1) to A(8) at the first shuffle stage can be changed as follows:

$$A(1) = X0 + X1, A(2) = X2 + X3, A(3) = X4 + X5, A(4) = X6 + X7 \quad (6)$$

$$A(5) = X0 - X1, A(6) = X2 - X3, A(7) = X4 - X5, A(8) = X6 - X7$$

The operation of the shuffle circuit at the pre-process/post-process stages for the two 4×8 DCTs is performed in the same manner as that in the 8×8 DCT beginning with the second shuffle stage.

In order to support both the different calculations of A(1) to A(8) at the first shuffle stage, a multiplexing circuit must be additionally provided to selectively supply inputs to input terminals of adders/subtracters at the first shuffle stage according to an operation mode. Such a multiplexing circuit is shown in FIG. 3.

Figure 3:
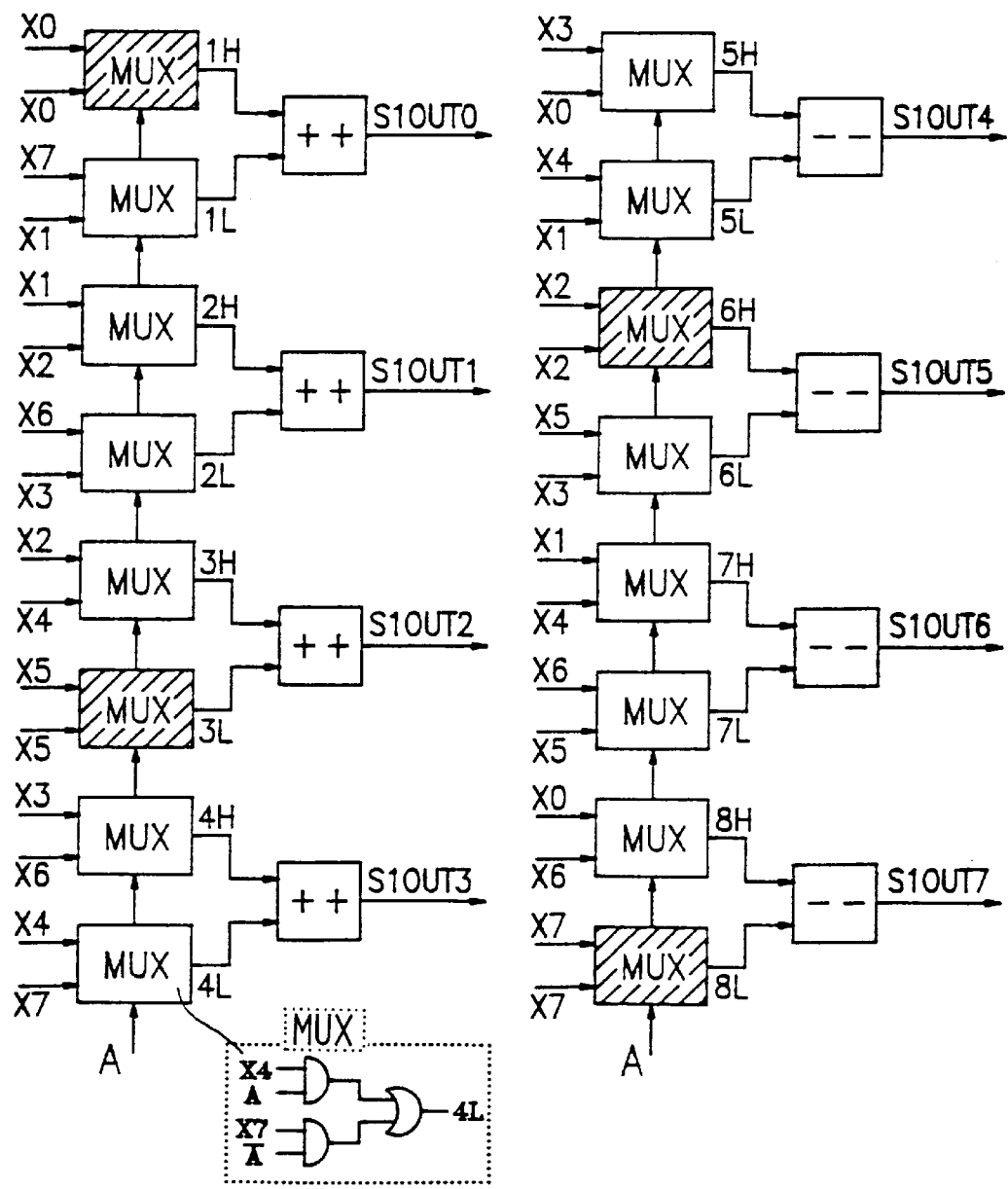
FIG. 3 is a detailed block diagram illustrating the improvement in a part a in FIG. 1 for the process of an 8×8 block and two 4×8 blocks in accordance with the present invention.

FIG. 3 is a detailed block diagram illustrating the construction of a multiplexing circuit for the improvement in a part a in FIG. 1 in accordance with the present invention. As shown in this drawing, the multiplexing circuit includes 12 2-bit multiplexers. The operation of the multiplexing circuit in FIG. 3 can be expressed by the following equations (7):

$$M(1H) = X0A + X0A, M(1L) = X7A + X1A \quad (7)$$

$$M(2H) = X1A + X2A, M(2L) = X6A + X3A$$

$$M(3H) = X2A + X4A, M(3L) = X5A + X5A$$

$$M(4H) = X3A + X6A, M(4L) = X4A + X7A$$

$$M(5H) = X3A + X0A, M(5L) = X4A + X1A$$

$$M(6H) = X2A + X2A, M(6L) = X5A + X3A$$

$$M(7H) = X1A + X4A, M(7L) = X6A + X5A$$

$$M(8H) = X0A + X6A, M(8L) = X7A + X7A$$

The calculated results M(1H), M(1L), ..., M(8H) and M(8L) in the above equations (7) are connected to input terminals of the first adders/subtracters at the preprocess/post-process stages, where the reference character "H" designates the results connected to the upper input terminals of the first adders/subtracters and the reference character "L" designates the results connected to the lower input terminals of the first adders/subtracters.

In a portion of FIG. 3 enlarging the construction of the multiplexer, the reference character "A" signifies an 8×8 DCT mode and the reference character "/A" signifies a 2×4×8 DCT mode. The results M(1H), M(3L), M(6H) and M(8L) with the same inputs are connected directly to the input terminals of the first adders/subtracters without using the multiplexing circuit.

On the other hand, a cosine matrix is multiplied by an input vector for the process of two different input block sizes. At this time, the cosine matrix is different according to the input block sizes. Namely, in the 8×8 DCT mode, the same cosine matrix is used in the two 8×1 DCTs. In the 2×4×8 DCT mode, the cosine matrix used in the 8×8 DCT mode is multiplied in the first 8×1 DCT. However, a 4×4 cosine matrix used in the upper calculation of the 8×1 DCT is multiplied in each of the two 4×1 DCTS. For this reason, the cosine matrix used in the lower 4×1 DCT is different from the 4×4 cosine matrix used in the conventional 8×1 DCT. The following table 1 shows a point of difference between the lower cosine matrix in the conventional 8×1 DCT and the cosine matrix in the lower 4×1 DCT.

TABLE 1

| 8 × 1 DCT | | LOWER | COSINE | MATRIX | LOWER | 4 × 1 DCT | COSINE | MATRIX |
|---|---|---|---|---|---|---|---|---|
| $\cos\theta$ | | $\cos 3\theta$ | $\cos 5\theta$ | $\cos 7\theta$ | $\cos 4\theta$ | $\cos 4\theta$ | $\cos 4\theta$ | $\cos 4\theta$ |
| $\cos 3\theta$ | | $-\cos 7\theta$ | $-\cos\theta$ | $-\cos 5\theta$ | $\cos 2\theta$ | $\cos 6\theta$ | $-\cos 6\theta$ | $-\cos 2\theta$ |

TABLE 1-continued

| 8 × 1 DCT | LOWER | COSINE | MATRIX | LOWER | 4 × 1 DCT | COSINE | MATRIX |
|---|---|---|---|---|---|---|---|
| cos5θ | −cos θ | cos7θ | cos3θ | cos4θ | −cos4θ | −cos4θ | cos4θ |
| cos7θ | −cos5θ | cos3θ | −cos θ | cos6θ | −cos2θ | cos2θ | −cos6θ |

An RAC circuit in the distributed arithmetic processing manner, which is designated by the reference character b in FIG. 1, must be modified in order to process two different input block sizes. Cosine matrices are stored in ROMs in the RAC circuit and all of them must be supported in a hardware manner. The multiplexing control operation is performed according to the block size in such a manner that the corresponding cosine matrix can be multiplied. Such an RAC circuit is shown in FIG. 4.

Figure 4:
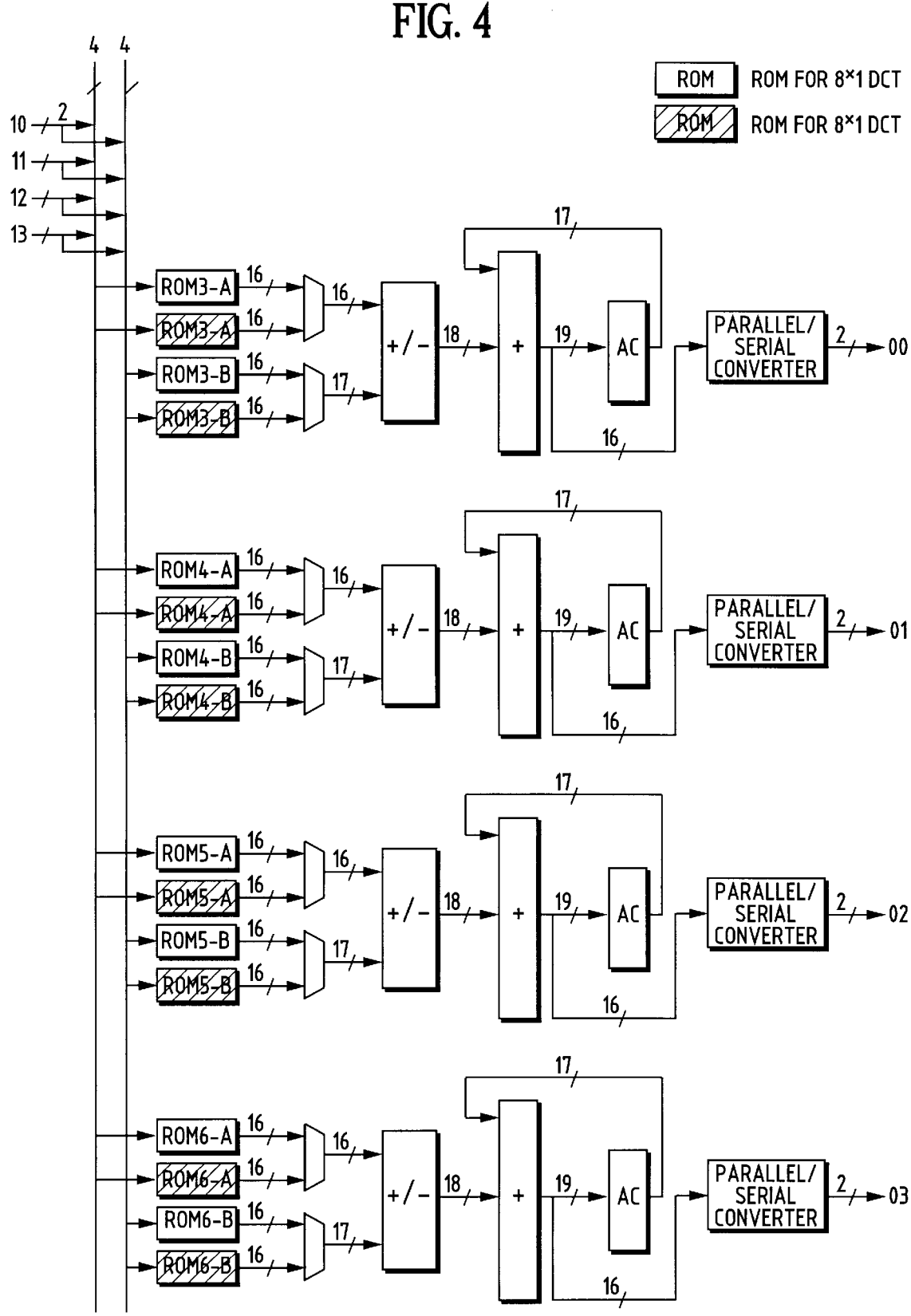
FIG. 4 is a detailed block diagram illustrating the improvement in a part b in FIG. 1 for the process of an 8×8 block and two 4×8 blocks in accordance with the present invention.

FIG. 4 is a detailed block diagram illustrating the construction of an RAC circuit for the improvement in the part b in FIG. 1 in accordance with the present invention. As shown in this drawing, ROM modules and multiplexing circuits for the process of the two 4×8 blocks are additionally provided in the conventional circuit. Namely, in order to process the two block sizes, the number of ROMs in the 4RAC is increased to twice that in the case of processing the 8×1 DCT. Also, 8 16-bit multiplexing circuits are additionally provided.

Different DCT operations are performed according to block sizes to process blocks required by the user. To this end, the hardware must support all circuits for processing two different block sizes. As a result, a multiplexing circuit must be provided in front of the first adders/subtracters in the shuffle circuit at the preprocess/post-process stages in the second one-dimensional DCT to control inputs to the first adders/subtracters. Also, a circuit must be provided in the lower 4×4 matrix multiplication part to select a cosine matrix according to the corresponding block size. Such a two dimensional DCT construction for selectively processing the input block is shown in FIG. 5.

Figure 5:
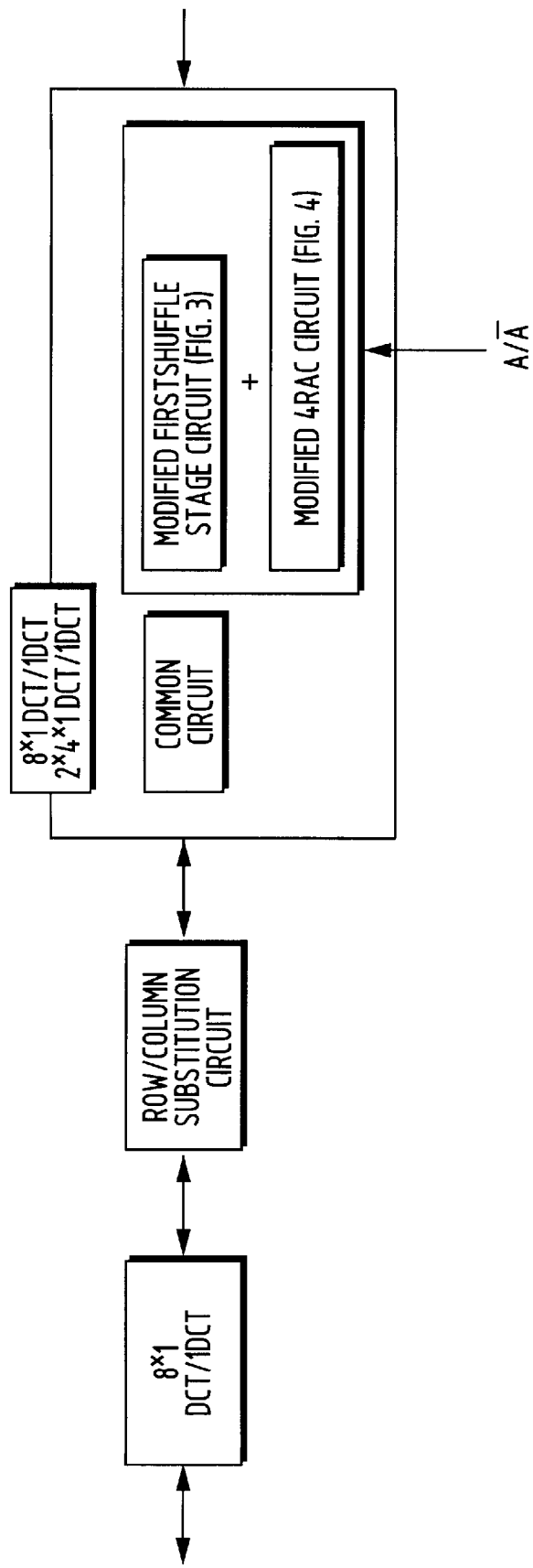
FIG. 5 is a schematic block diagram illustrating the construction of a two-dimensional DCT circuit in accordance with the present invention.

FIG. 5 is a schematic block diagram illustrating the construction of a two-dimensional DCT circuit in accordance with the present invention. As shown in this drawing, the two-dimensional DCT circuit comprises the conventional 8×1 DCT module and row/column substitution circuit and an additional 8×1 DCT module for the process of two different block sizes.

As apparent from the above description, the present invention provides the DCT circuit for processing the 8×8 block and two 4×8 blocks. According to the present invention, a small number of components are additionally provided in the conventional DCT construction to process two different input block sizes. That is, only 8 ROM modules and multiplexers for the data path control are additionally provided in the conventional DCT construction to process all the 8×8 block and two 4×8 blocks. Therefore, two different input block sizes can be processed with low cost and simple construction.

Although the preferred embodiments of the present invention have been disclosed for illustrative purposes, those skilled in the art will appreciate that various modifications, additions and substitutions are possible, without departing from the scope and spirit of the invention as disclosed in the accompanying claims.

What is claimed is:

1. A one-dimensional discrete cosine transform circuit for processing an 8×1 block and two 4×1 blocks, said circuit comprising:

first and second shuffle circuits having adders/subtracters for use in performing a one-dimensional discrete cosine transform;

first multiplexing means for selecting inputs to adders/subtracters in said second shuffle circuit according to an input block size;

storage means for storing a data table to support cosine matrices used to perform a matrix multiplication operation based on the input block size; and second multiplexing means for selecting a desired output from said storage means according to the input block size;

whereby a discrete cosine transform of two different block sizes can be implemented in a single circuit and controlled to process both forward and inverse discrete cosine transforms.

2. The one-dimensional discrete cosine transform circuit for processing an 8×1 block and two 4×1 blocks, as set forth in claim 1, wherein:

said first multiplexing means includes a plurality of 2-bit multiplexers for selecting inputs to adders/subtracters in a first stage of said second shuffle circuit according to the input block size to process two different block sizes in performing said second one-dimensional discrete cosine transform.

3. A method for processing by one-dimensional discrete cosine transform an 8×1 block of data and two 4×1 blocks of data, said method comprising:

performing a first one-dimensional discrete cosine transform on input data using a first shuffle circuit having adders/subtracters;

performing a second one-dimensional discrete cosine transform on data output from a second shuffle circuit having adders/subtracters;

selecting inputs to adders/subtracters in said second shuffle circuit according to an input block size;

storing a data table to support cosine matrices used to perform a matrix multiplication operation based on the input block size; and selecting a desired output from said table according to the input block size;

whereby a discrete cosine transform of two different block sizes can be implemented in a single circuit and controlled to process both forward and inverse discrete cosine transforms.

4. The one-dimensional discrete cosine transform method for processing an 8×1 block and two 4×1 blocks, as set forth in claim 3 wherein:

said selecting input step includes selecting inputs to adders/subtracters in a first stage of said second shuffle circuit according to the input block size to process two different block sizes in performing said second one-dimensional discrete cosine transform.

5. Apparatus for discrete cosine transform (DCT) processing one input 8×1 block of data or two input 4×1 blocks of data, said apparatus comprising:

first and second shuffle circuits having adders/subtracters for use in one-dimensional DCT processing;

first multiplexing means for selecting inputs of adders/ subtracters in said second shuffle circuit according to input block size;

storage means for storing two cosine matrix tables, one for an 8×1 block, the other for two 4×1 blocks, for use in performing a matrix multiplication operation based on input block size; and second multiplexing means for selecting a desired output from said storage means according to input block size;

whereby apparatus for DCT processing of two different input block sizes are all implemented in a single composite circuit and controlled to process forward and inverse discrete cosine transforms.

6. A discrete cosine transform circuit for processing an input 8×1 block of data or two 4×1 blocks of data, as set forth in claim 1, wherein said first multiplexing means include:

a plurality of 2-bit multiplexers for selecting inputs of adders/subtracters in each shuffle circuit; and a plurality of 16-bit multiplexers for selecting an output from the storage means according to the input block size so as to process two different block sizes.

7. A two dimensional discrete cosine transform circuit for processing of two different input block sizes of data, comprising:

a first 8×1 discrete cosine transform circuit for processing one input 8×8 block in row order to respective first outputs;

a row/column transposition circuit connected to receive said first outputs and to provide second outputs in transposed row/column order; and a second 8×1 discrete cosine transform circuit connected to receive said second outputs and including means for extending a second 8×1 discrete cosine transform circuit to transform two 4×8 blocks or one 8×8 block in column order.

8. Method for discrete cosine transform (DCT) processing of one input 8×1 block of data or two input 4×1 blocks of data, said method comprising:

performing one-dimensional DCT processing on input data using first and second shuffle circuits respectively having adders/subtracters with plural inputs and respectively corresponding outputs;

selecting inputs of said adders/subtracters in each shuffle circuit for receiving input data according to input block size;

storing two cosine matrix tables, one for an 8×1 block, the other for two 4×1 blocks, for use in performing a matrix multiplication operation of data output from said adders/subtracters based on input block size; and selecting a desired output from said tables according to input block size;

whereby DCT processing of two different input block sizes are all implemented in a single composite circuit and controlled to process forward and inverse discrete cosine transforms.

9. A discrete cosine transform method for processing an input 8×1 block of data or two 4×1 blocks of data, as set forth in claim 8, wherein said selecting inputs step includes:

selecting one of two inputs of adders/subtracters in each shuffle circuit; and selecting one of sixteen outputs from the table according to the input block size so as to process two different block sizes.

10. A two dimensional discrete cosine method for processing of two different input block sizes of data, comprising:

processing one input 8×8 block in row order to provide first outputs;

transposing row/column block entries of said first outputs to provide transposed second outputs; and processing said second outputs by extending a first 8×1 discrete cosine transform process to transform two 4×8 blocks or one 8×8 block in column order.

* * * * *